United States Patent

[11] 3,590,943

[72] Inventors Victor Millman
5037 Faber Way, San Diego, Calif. 92115;
Remo Tontini, 4434 Santa Monica, San Diego, Calif. 92107
[21] Appl. No. 847,069
[22] Filed Apr. 4, 1969
[45] Patented July 6, 1971

[54] SOUND SUPPRESSING APPARATUS
12 Claims, 4 Drawing Figs.
[52] U.S. Cl. .................................................. 181/33 HC,
181/33 HD, 181/33 E, 239/127.3, 239/265.13, 239/265.33
[51] Int. Cl. ....................................................... B64d 33/06, B64c 9/38
[50] Field of Search .......................................... 181/43, 51, 33, 64.1, 33.221, 33.222, 33.05; 239/127.3, 265.11, 265.13, 265.17, 265.19, 265.23, 265.33

[56] References Cited
UNITED STATES PATENTS
2,839,891  6/1958  Drakeley ..................... 239/265.19
3,027,710  4/1962  Maytner ...................... 181/33 (.221)
3,174,282  3/1965  Harrison ...................... 181/33 (.221)
3,495,682  2/1970  Treiber ........................ 181/60 X
FOREIGN PATENTS
1,436,412  3/1966  France ......................... 181/33 (.221)
1,019,857  2/1966  Great Britain ................ 239/265.33

Primary Examiner—Robert S. Ward, Jr.
Attorney—George E. Pearson

ABSTRACT: Support means carried by engine housing has pivotal mounting means at aft end. Support means axially slidable between forward stowed position and aft deployed position. In latter, pivotal mounting means is adjacent to nozzle exit. Noise shield is swingably mounted on mounting means to swing vertically on lateral axis. Shield is elongate and preferably trough shaped to surround jet stream and reflect noise upward. Optimum results require holding shield at suitable angle to intercept expansion boundary of jet stream. Aft end of shield is supported or forced up in flight to best position by aerodynamic reacting vanes, which may be preset or controlled in response to sensor carried by shield. When support means is stowed, shield is carried forward to stow in streamlined relation to engine housing.

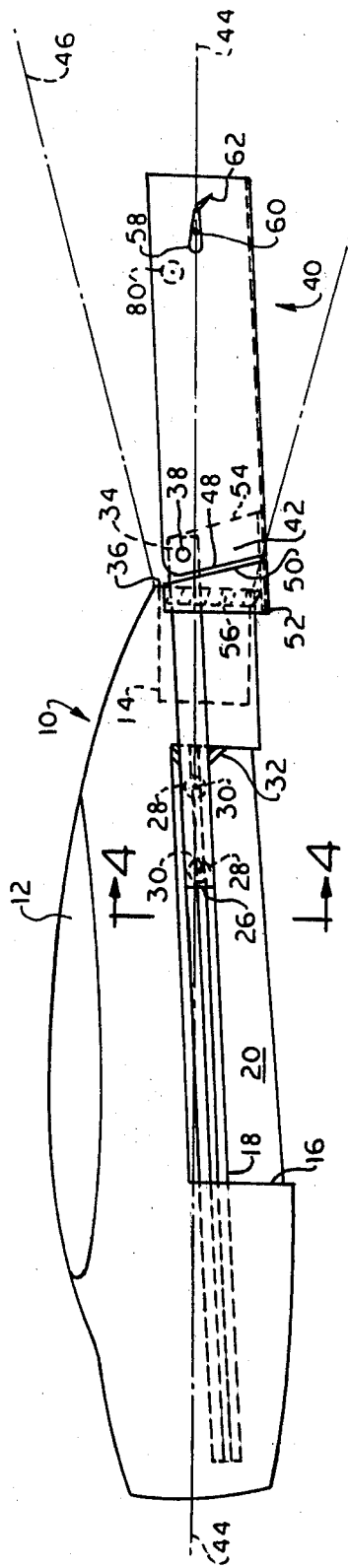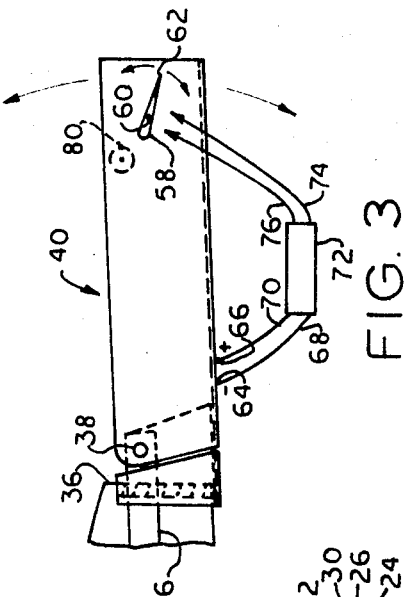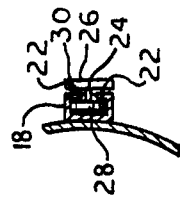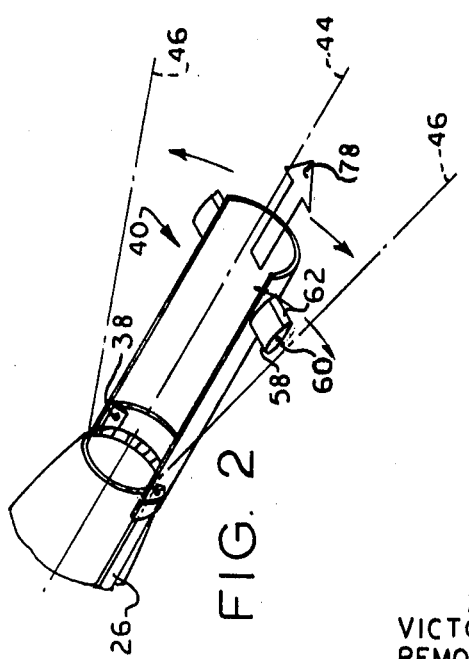

3,590,943

1

SOUND SUPPRESSING APPARATUS

BACKGROUND OF THE INVENTION

This invention lies in the field of sound suppression of gas turbine or jet engines, which produce reaction thrust by ejecting a high velocity stream of gas from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which that portion of the noise which produces objectionable effects at ground level is largely prevented from being emitted downward while no control is exercised over the noise which is radiated upward. It is directed particularly to a system which acts to reflect the objectionable noise upward and which will function just as effectively with a simple nozzle as with one which is equipped with other sound suppression devices. Various schemes have been proposed which make use of sound reflection to some extent but they have generally failed because the reflector function was only a small part of a complicated apparatus or because they were so designed and constructed that they were not capable of reflecting more than a minimal amount of the objectionable noise.

SUMMARY OF THE INVENTION

The present invention provides a very satisfactory solution to the problem with a limited amount of equipment and very few moving parts requiring repair, maintenance, or adjustment. Generally stated, the system includes a support and guide track carried by the engine housing, support and guide track carried by the engine housing, support means axially movable on the track and having pivotal mounting means at the aft end, and a noise reflector and suppressor shield pivotally connected adjacent its forward end to the pivotal mounting means for swinging vertically on a generally horizontal lateral axis. When the support means is rearwardly deployed the pivotal mounting means is in the vicinity of the nozzle exit, and the shield trails behind.

The shield is elongate and preferably troughlike and upwardly concave. It is also wide enough to embrace the lower portion of the jetstream at the nozzle exit. Means are provided, preferably in the form of aerodynamic reacting vanes carried by the shield, for producing sufficient lifting force to support the rear portion of the shield and force it into position to intercept the expansion boundary of the jetstream issuing from the nozzle.

The vanes may be preset for each installation after several test flights to determine the proper setting to lift the shield to the angle with respect to the nozzle axis at which optimum results are obtained. Alternatively, the vanes, or portions of them, may be movable about lateral axes. A sensor is carried by the shield and sense the optimum operating condition when the stream attaches to the shield, and a known type of control device is actuated by signals from the sensor to operate the vanes.

Since the vanes do not produce sufficient lifting force during the takeoff run to support the shield and noise suppression is important at this stage, stop means are provided to limit the drop or angular departure of the shield from the jetstream axis to a position somewhat less than the optimum but sufficient to produce significant noise suppression.

It has been determined that sound waves are emitted substantially radially outward from the cone of noise produced by the jetstream so that only the lower half of the cone produces the objectionable ground-directed noise. Since the shield encompasses the lower half, approximately, of the jetstream immediately downstream of the nozzle exit where the noise is initiated, and the stream is forced to flow along its length, the shield is able to reflect upwardly the objectionable sound waves while it is not necessarily to control those which are originally directed upwardly. Thus the device functions very well with simple nozzles or with those which have other suppressor devices. The present invention comprises an improvement over the invention disclosed and claimed in the application of Millman et al., Ser. No. 817,018, filed Apr. 17, 1969 and assigned to Rohr Corporation, the assignee of the present application.

BRIEF DESCRIPTION OF THE DRAWINGS

Various other advantages and features of novelty will become apparent as the description proceeds in conjunction with the accompanying drawing, in which:

FIG. 1 is a schematic side elevational view of an engine nacelle or housing showing the apparatus of the invention in working position;

FIG. 2 is a schematic perspective view illustrating the manner of operation;

FIG. 3 is a schematic side elevational view showing a suitable sensing and control means; and FIG. 4 is a sectional view taken on line 4-4 of FIG. 1.

DESCRIPTION OF PREFERRED EMBODIMENTS

The general arrangement illustrated in FIG. 1 shows the apparatus mounted on an airplane in deployed position ready for use in takeoff and climb operation. An engine, not shown, is mounted within nacelle or housing 10, carried by wing 12, and is provided with a tail pipe or nozzle 14 which may terminate in about the same general plane as the aft end of the housing, although this is not essential. A generally semicylindrical opening 16 is formed in the lower part of the housing and is dimensioned to receive the shield and associated parts in a manner to define a streamlined configuration for normal cruising flight. An elongate generally axially directed support and guide track 18 is mounted on the inner wall 20 of the housing and extends forwardly of opening 16.

As best seen in FIG. 4, the track is in the form of a rectangular channel, the web of which is secured by any suitable means to inner wall 20 of the housing. Flanges 22 define a narrow elongate slot 24 leading into a rectangular guide passage. A support means 26 is formed as a cantilever beam and is provided near its forward end with a pair of longitudinally spaced rollers 28 mounted for longitudinal rolling movement in the guide passage of track 18. The rollers are connected to beam 26 by axles 30 which pass freely through slot 24. Thus the beam may move from its deployed position shown in FIG. 1 to a stowed position at the forward end of track 18. Any suitable means may be provided for moving the beam between its extreme positions of adjustment, such as fore and aft spaced fixed pulleys, a supply and takeup reel, and cables attached to the reel and passing in reverse fashion over the pulleys and attached to an anchorage on the beam. The aft end of track 18 is flared at 32 for a purpose to be described above is duplicated on the opposite side of the housing, not shown.

As will be noted in FIG. 1, when the beams or support means are fully deployed, their aft ends 34 extend a short distance aft of the nozzle exit 36 and they are provided with pivotal mounting means 38. An elongate reflector-suppressor shield 40 is located in a position extending downstream from the nozzle, and its longitudinal axis makes a slight angle with the axis of the nozzle. At its forward end 42 it is connected to the pivotal mounting means 38 for swinging vertically about a generally horizontal axis transverse to and substantially intersecting the axis 44 of the nozzle. As shown in FIG. 2 the shield is trough-shaped and concave upward, and may be generally semicylindrical in cross section so that it may fit in streamlined manner in opening 16 of housing 10 when stowed. Preferably the shield is so dimensioned that it will surround the lower half of the expansion boundary 46 of the jet stream and reflect upward the major portion of the noise emitted thereby. It has been determined that excellent results are obtained when the length of the shield is four to six times the diameter of the nozzle.

The pivoted shield 40 is free to swing upwardly to any desired angle with the axis 44 of the nozzle. Its downward movement or "drop" is limited by contact of its forward edge 48 with the aft edge 50 of the curved plate 52 which surrounds the lower portion of the nozzle exit and is fixedly connected to the aft ends of both support means or beams 26 on opposite sides of the housing, serving the dual purpose of uniting the beams and acting as a stop for shield 40. Preferably the parts are so dimensioned that shield 40 will be held, for the ground run, at an angle slightly lower than the optimum to allow for adjustment during climb but high enough to provide significant noise suppression during the ground run. A flexible liner 54 may be secured to the inner wall of plate 52 so as to extend, if desired, into the forward end 42 of the shield, thus preventing any gap when the shield swings upward. A series of overlapping vanes 56 may also advantageously be provided at the aft end of the housing 10, and they may be swung radially outward to contact the inner surface of liner 54 to close the gap between the liner and the outer wall of the housing (or if a liner is not used, to contact the inner surface of plate 52).

The attitude of shield 40 is controlled by mechanism which includes aerodynamic reacting means or vanes 58 extending laterally from each side of the shield. The vanes may be pivoted at 50 for free rotation or they may be fixed and provided with flaps 62 movable to vary the lift characteristics of the vanes. In the simplest form, the vanes are presettable on the ground to attitudes determined by prior experiment to be appropriate for supporting the shield in optimum operating relation with the jet stream in a given installation.

A more automatic arrangement is schematically illustrated in FIG. 3, in which a sensor in the form of differential pressure probe means 64, 66 is located in the bottom of the trough of shield 40 a predetermined distance rearwardly of the nozzle exit and acts to detect the position of attachment of the expanding jet. Signals from the probe means are transmitted by conductors 68, 70 to a proportional control unit 72, which in turn sends appropriate control signals through conductors 74, 76 to servo means, not shown, which adjust vane 58 or its flap 62 to the necessary extent.

Referring to FIGS. 1 and 2, the normal expansion boundary of a jetstream from a simple nozzle is typically as indicated by lines 46. The preponderance of the high level noise developed by the jetstream is initiated in a short distance downstream of the nozzle and produces a cone of noise having a substantially larger included angle than that of the jetstream boundary. As stated above, it has been determined that the noise radiates outwardly from this cone so that when the axis of the cone is generally horizontal the upper half radiates its noise in an upward direction which is not objectionable. By interposing the shield of this invention below the source of the downwardly directed noise it is possible to reflect the emitted sound waves upwardly along with those emitted from the upper half of the noise cone. The shield is preferably trough-shaped because during ground run the horizontal emanations are objectionable and in the air it eliminates the downward component of the almost horizontal emanations.

It has been found that to achieve optimum results the shield must intercept the normal expansion boundary of the jetstream and attach to the stream in accordance with the well known Coanda effect, so that the lower portion of the stream is confined and issues axially from the aft end of the shield as indicated by arrow 78. As also previously mentioned, the majority of the noise is reflected upward when the length of the shield is from four to six times the nozzle diameter, or the equivalent diameter of a modified nozzle. These conditions are met by the very simple mechanism disclosed herein. The primary load on the shield is taken up by the lifting vanes so that minimum forces need be transmitted into the structure.

For stowing purposes the entire movable structure is translated forwardly on rails 18 until shield 40 and curved plate 52 fit within opening 16 of housing 10 in streamlined manner. The shield is provided near its aft end with rollers 80 located inwardly of the wall in general fore and aft alignment with rollers 28. As the shield approaches stowed position, roller 80 on each side enters the aft end of track 18, this being facilitated by the flared portion 32 which accommodates vertical misalignment. The supporting effect of roller 80 takes the cantilever load off beam 26 during normal flight.

A simple beam construction for stowing and deploying the suppressor means has been shown for clarity of illustration. A relatively longer shield may be used when mounted on multiple tracks similar to file drawer guide rails. A suitable multiple track arrangement for mounting the suppressor of this invention is illustrated and described in the application of Millman et al. cited above.

Having thus described the invention, what we claim as new and useful and desire to be secured by U.S. Letters Patent is:

1. Sound suppressing apparatus for use in combination with an aircraft propelled by a jet engine, comprising: a housing surrounding a jet engine having a rearwardly discharging jet nozzle; support means carried by said housing and provided with pivotal mounting means; and an elongate noise reflecting and suppressing shield pivotally connected adjacent its forward end to said pivotal mounting for swinging about a generally horizontal axis transverse to the axis of the nozzle and with the center of said forward end in the vicinity of the lowermost portion of the nozzle exit; said shield being swingable upwardly to intercept the expansion boundary of the jetstream issuing from the nozzle; and means to control the angle of the longitudinal axis of the shield with respect to the axis of the nozzle to obtain optimum interception of the jetstream boundary.

2. Apparatus as claimed in claim 1; the means to control the angle of the shield being presettable to cause the shield to move to the desired angle in flight to produce optimum results.

3. Apparatus as claimed in claim 1; including sensing means carried by the shield to sense the operating relation between the shield and the jetstream; and said control means acting in response to the indications given by said sensing means to cause the angle of the shield to vary until optimum conditions are attained.

4. Apparatus as claimed in claim 1; including interengaging means on said support means and said shield to limit the angular departure of the shield from the axis of the nozzle.

5. Apparatus as claimed in claim 1; said support means being movable fore and aft between a first, deployed position with its pivotal mounting in the vicinity of the nozzle exit and the shield extending rearwardly of the nozzle exit and a second, stowed position at the forward portion of the housing with the shield stowed forward of the nozzle exit.

6. Apparatus as claimed in claim 5; further including a support and guide track carried by the housing; means on the support means to engage the track for movement therealong; and means on said shield to engage the track in stowed position to prevent swinging movement of the shield.

7. Apparatus as claimed in claim 1; said shield being generally trough-shaped in cross section and upwardly concave of sufficient width to surround the lower portion of the jetstream at the nozzle exit.

8. Apparatus as claimed in claim 7; the transverse pivotal axis of the shield substantially intersecting the axis of the nozzle.

9. Apparatus as claimed in claim 1; the means to control the angle of the shield comprising aerodynamic reacting means carried by the shield and serving to apply vertical forces thereto for varying its angle with respect to the axis of the nozzle.

10. Apparatus as claimed in claim 9; said aerodynamic reacting means comprising at least one vane extending laterally from a side of said shield; at least a portion of said vane being movable to vary the lift characteristics of the vane.

11. Apparatus as claimed in claim 9; said aerodynamic reacting means being settable to predetermined positions to produce predetermined resultant forces on the shield.

12. Apparatus as claimed in claim 9; said aerodynamic reacting means being movable in flight; sensing means carried by the shield to sense the operating relation between the shield and the jetstream; and said control means acting in response to the indication given by said sensing means to vary the position of said aerodynamic reacting means and consequently vary the resultant forces on the shield.